(12) United States Patent
Oliensis

(10) Patent No.: US 6,859,549 B1
(45) Date of Patent: Feb. 22, 2005

(54) METHOD FOR RECOVERING 3D SCENE STRUCTURE AND CAMERA MOTION FROM POINTS, LINES AND/OR DIRECTLY FROM THE IMAGE INTENSITIES

(75) Inventor: John Oliensis, New York, NY (US)

(73) Assignee: NEC Laboratories America, Inc., Princeton, NJ (US)

(*) Notice: Subject to any disclaimer, the term of this patent is extended or adjusted under 35 U.S.C. 154(b) by 502 days.

(21) Appl. No.: 09/653,023

(22) Filed: Sep. 1, 2000

Related U.S. Application Data

(60) Provisional application No. 60/210,099, filed on Jun. 7, 2000.

(51) Int. Cl.[7] .............................. G06K 9/00; G06K 9/32
(52) U.S. Cl. ....................................... 382/154; 382/296
(58) Field of Search ................................ 382/103, 154, 382/284, 289, 294, 296; 348/36, 42, 51

(56) References Cited

U.S. PATENT DOCUMENTS 6,614,429 B1 * 9/2003 Zhang et al. ................ 345/420

OTHER PUBLICATIONS

Oliensis et al., "Structure from Motion using Points, Lines, and Intensities," IEEE, pp. 599–605, 2000.*
Aguiar et al., "Factorization as a Rank 1 Problem," IEEE, pp. 178–184, 1999.*
Kung et al., "An SVD Approach to Multi–Camera–Multi–Target 3D Motion–Shape Analysis," IEEE, pp. 573–577, 1994.*
Diamantaras et al., "Camera Motion Parameter Recovery Under Perspective Projection," IEEE, pp. 807–810, 1996.*
Astrom et al., "Structure and Motion From Lines Under Affine Projections," IEEE, pp. 285–292, 1999.

Azarbayejani et al., "Recursive Estimation of Motion, Structure, and Focal Length," IEEE Transactions on Pattern Analysis and Machine Intelligence, vol. 17, No. 6, pp. 562–575, 1995.
Bergen et al., "Hierarchical Model–Based Motion Estimation," ECCV, pp. 237–252, 1992.
Burt et al., "The Laplacian Pyramid as a Compact Image Code," IEEE Transactions on Communications, vol. COM–31, No. 4, pp. 532–540, 1983.
Fermuller et al., "On the Geometry of Visual Correspondence," International Journal of Computer Vision, vol. 21, No. 3, pp. 223–247, 1997.
Fermuller et al., "Direct Motion Perception," in Visual Navigation, pp. 135–177, 1997.

(List continued on next page.)

*Primary Examiner*—Mehrdad Dastouri
*Assistant Examiner*—Virginia Kibler

(57) ABSTRACT

An algorithm for recovering structure and motion from points, lines and/or image intensities. The algorithm combines feature based reconstruction and direct methods. The present invention is directed to a method for recovering 3D scene structure and camera motion from image data obtained from a multi-image sequence, wherein a reference image of the sequence is taken by a camera at a reference perspective and one or more successive images of the sequence are taken at one or more successive different perspectives by translating and/or rotating the camera. The method comprising the steps of (a) determining image data shifts for each successive image with respect to the reference image; the shifts being derived from the camera translation and/or rotation from the reference perspective to the successive different perspectives; (b) constructing a shift data matrix that incorporates the image data shifts for each image; (c) calculating two rank-3 factor matrices from the shift data matrix using SVD, one rank-3 factor matrix corresponding the 3D structure and the other rank-3 factor matrix corresponding the camera motion; (d) recovering the 3D structure from the 3D structure matrix using SVD by solving a linear equation; and (e) recovering the camera motion from the camera motion matrix using the recovered 3D structure.

10 Claims, 2 Drawing Sheets

OTHER PUBLICATIONS

Fernmuller et al., "Qualitative Egomotion," International Journal of Computer Vision, vol. 15, pp. 7–29, 1995.

Fermuller, "Passive Navigation as a Pattern Recognition Problem," International Journal of Computer Vision, vol. 14, pp. 147–158, 1995.

Fermuller et al., "Direct Perception of Three–Dimensional Motion from Patterns of Visual Motion," Science, vol. 270, pp. 1973–1976, 1995.

Hanna, "Direct multi–resolution estimation of ego–motion and structure from motion," IEEE Motion Workshop, pp. 156–162, 1991.

Harris et al., "3D positional integration from image sequences," IVC, vol. 6, No. 2, pp. 87–90, 1988.

Hartley, "Lines and Points in Three Views and the Trifocal Tensor," IJCV, pp. 1–24, 1997.

Hartley, "In Defense of the Eight–Point Algorithm," IEEE Transactions on Pattern Analysis and Machine Intelligence, vol. 19, No. 6, pp. 580–593, 1997.

Holt et al., "Number of Solutions for Motion and Structure from Multiple Frame Correspondence," International Journal of Computer Vision, vol. 23, No. 1, pp. 5–15, 1997.

Holt et al., "Uniqueness of Solutions to Structure and Motion from Combinations of Point and Line Correspondences," Journal of Visual Communication and Image Representation, vol. 7, No. 2, pp. 126–136, 1996.

Horn et al., "Direct Methods for Recovering Motion," International Journal of Computer Vision, vol. 2, pp. 51–76, 1988.

Horn et al., "Determining Optical Flow," Artificial Intelligence, pp. 185–203, 1981.

Irani, "Multi–Frame Optical Flow Estimation Using Subspace Constraints," IEEE, 1999.

Irani et al., "Recovery of Ego–Motion Using Region Alignment," IEEE Transactions on Pattern Analysis and Machine Intelligence, vol. 19, No. 3, pp. 268–272, 1997.

Jepson et al., "Linear Subspace Methods for Recovering Translational Direction," in Spatial Vision in Humans and Robots, Cambridge University Press, pp. 39–62, 1993.

Lucas et al., "An Iterative Image Registration Technique with an Application to Stereo Vision," Proceedings of the Seventh International Joint Conference on Artificial Intelligence, vol. II, pp. 674–679, 1981.

Mitiche et al., "Counting Straight Lines," Computer Vision, Graphics, and Image Processing, vol. 47, pp. 353–360, 1989.

Morris et al., "A Unified Factorization Algorithm for Points, Line Segments and Planes with Uncertainty Models," ICCV, pp. 696–702, 1998.

Oliensis, "Direct Multi–Frame Structure from Motion for Hand–Held Cameras (1372)", NECI Technical Report, 1999.

Oliensis, "A Multi–Frame Structure–from–Motion Algorithm under Perspective Projection," International Journal of Computer Vision, vol. 34, pp. 163–192, 1999.

Oliensis et al., "Fast Algorithms for Projective Multi–Frame Structure from Motion," IEEE, pp. 536–543, 1999.

Oliensis, "Computing the Camera Heading from Multiple Frames," IEEE, pp. 203–210, 1998.

Oliensis, "Structure from Linear or Planar Motions," IEEE, pp. 335–342, 1996.

Oliensis, "Rigorous Bounds for Two–Frame Structure from Motion," ECCV, pp. 184–195, 1996.

Quan et al., "Affine Structure from Line Correspondences with Uncalibrated Affine Cameras," IEEE Transactions on Pattern Analysis and Machine Intelligence, vol. 19, No. 8, pp. 834–845, 1997.

Salari et al., "A Method to Calculate the Structure and Motion Parameters From Line Correspondences," Pattern Recognition, vol. 23, No. 6, pp. 553–561, 1990.

Soatto et al., "Reducing "Structure From Motion": A General Framework for Dynamic Vision Part 1: Modeling", IEEE Transactions on Pattern Analysis and Machine Intelligence, vol. 20, No. 9, pp. 933–942, 1998.

Spetsakis, "A Linear Algorithm for Point and Line–Based Structure from Motion," CVGIP: Image Understanding vol. 56, No. 2, pp. 23–241, 1992.

Spetsakis et al., "Structure from Motion Using Line Correspondences," International Journal of Computer Vision, vol. 4, pp. 171–183, 1990.

Stein et al., "Model–based Brightness Constraints: on Direct Estimation of Structure and Motion," IEEE, pp. 400–406, 1997.

Sturm et al., "A Factorization Based Algorithm for Multi–Image Projective Structure and Motion," 4th European Conference on Computer Vision, pp. 709–720, 1996.

Taylor et al., "Structure and Motion from Line Segments in Multiple Images," IEEE Transactions on Pattern Analysis and Machine Intelligence, vol. 17, No. 11, pp. 1021–1032, 1995.

Tomasi et al., "Shape and Motion from Image Streams under Orthography: a Factorization Method," International Journal of Computer Vision, vol. 9, pp. 137–154, 1992.

Torr et al., "Maintaining Multiple Motion Model Hypotheses Over Many Views to Recover Matching and Structure," ICCV, pp. 485–491, 1998.

Triggs, "Factorization Methods for Projective Structure and Motion," IEEE, pp. 845–851, 1996.

Weng et al., "Optimal Motion and Structure Estimation," IEEE Transactions on Pattern Analysis and Machine Intelligence, vol. 15, No. 9, pp. 864–884, 1993.

Weng et al., "Estimating Motion and Structure from Line Matches: Performance Obtained and Beyond," IEEE, pp. 168–172, 1990.

Weng et al., "Motion and Structure from Two Perspective Views: Algorithms, Error Analysis, and Error Estimation," IEEE Transactions on Pattern Analysis and Machine Intelligence, vol. 11, No. 5, pp. 451–476, 1989.

Zelnik–Manor et al., "Multi–Frame Alignment of Planes," CVPR, pp. 151–156, 1999.

Torr, "Geometric Motion Segmentation and Model Selection," Phil. Trans. R. Soc. London A, pp. 1–17, 1996.

Torr, "Model Selection for Two View Geometry: A Review," Microsoft Research paper.

Zelnik–Manor et al., "Multi–View Subspace Constraints on Homographics," IEEE, 1999.

Kumar et al., "Shape recovery from multiple views: a parallax based approach," David Saranoff Research Center, pp. 947–955.

Stein et al., "Model–based Brightness Constraints: on Direct Estimation of Structure and Motion".

Hartley, "A linear method for reconstruction from lines and points," GE–Corporate Research and Development.

Hanna et al., "Combining Stereo and Motion Analysis for Direct Estimation of Scence Structure," IEEE, pp. 357–365, 1993.

Cohen, "Dense Recovery of Planar–Parallax from Multiple Frames," Thesis for the M.Sc. Degree of Meir Cohen, Weizmann Institute of Science, 1999.

Lucas et al., "Optical Navigation by the Method of Differences," Computer Science Department of Carnegie–Mellon University.

Fermuller et al., "Global rigidity constraints in image displacement fields," IEEE, pp. 245–250, 1995.

* cited by examiner

METHOD FOR RECOVERING 3D SCENE STRUCTURE AND CAMERA MOTION FROM POINTS, LINES AND/OR DIRECTLY FROM THE IMAGE INTENSITIES

RELATED APPLICATIONS

The present application is related to U.S. application Ser. No. 09/652,820, titled A Method for Recovering 3D Scene Structure and Camera Motion Directly from Image Intensities, filed on Aug. 31, 2000, by the same inventor as the present application which related application is incorporated herein by reference. This application claim benefit of Provisional 60/210,099 filed Jun. 7, 2000.

BACKGROUND OF THE INVENTION

1. Field of the Invention

The present invention is directed to a method for recovering 3D structure and camera motion, and more particularly to a linear algorithm for recovering the structure and motion data from points, lines, and/or directly from the image intensities.

2. Prior Art

The science of rendering a 3D model from information derived from a 2D image predates computer graphics, having its roots in the fields of photogrammetry and computer vision.

Photogrammetry is based on the basic idea that when a picture is taken, the 3D world is projected in perspective onto a flat 2D image plane. As a result, a feature in the 2D image seen at a particular point actually lies along a particular ray beginning at the camera and extending out to infinity. By viewing the same feature in two different photographs the actual location can be resolved by constraining the feature to lie on the intersection of two rays. This process is known as triangulation. Using this process, any point seen in at least two images can be located in 3D. It is also possible to solve for unknown camera positions as well with a sufficient number of points. The techniques of photgrammetry and triangulation were used in such applications as creating topographic maps from aerial images. However the photogrammetry process is time intensive and inefficient.

Computer vision techniques include recovering 3D scene structure from stereo images, where correspondence between the two images is established automatically from two images via an iterative algorithm, which searches for matches between points in order to reconstruct a 3D scene. It is also possible to solve for the camera position and motion using 3D scene structure from stereo images.

Current computer techniques are focused on motion-based reconstruction and are a natural application of computer technology to the problem of inferring 3D structure (geometry) from 2D images. This is known as Structure-from-Motion. Structure from motion (SFM), the problem of reconstructing an unknown 3D scene from multiple 2D images, is one of the most studied problems in computer vision.

Most SFM algorithms that are currently known reconstruct the scene from previously computed feature correspondences, usually tracked points. Other algorithms are direct methods that reconstruct from the images intensities without a separate stage of correspondence computation. Previous direct methods were limited to a small number of images, required strong assumptions about the scene, usually planarity or employed iterative optimization and required a starting estimate.

These approaches have complementary advantages and disadvantages. Usually some fraction of the image data is of such low quality that it cannot be used to determine correspondence. Feature-based method address this problem by pre-selecting a few distinctive point or line features that are relatively easy to track, while direct methods attempt to compensate for the low quality of some of the data by exploiting the redundancy of the total data. Feature-based methods have the advantage that their input data is relatively reliable, but they neglect most of the available image information and only give sparse reconstructions of the 3D scene. Direct methods have the potential to give dense and accurate 3D reconstructions, due to their input data's redundancy, but they can be unduly affected by large errors in a fraction of the data.

A method based on tracked lines is described in "A Linear Algorithm for Point and Line Based Structure from Motion", M. Spetsakis, CVGIP 56:2 230–241, 1992, where the original linear algorithm for 13 lines in 3 images was presented. An optimization approach is disclosed in C. J. Taylor, D. Kriegmann, "Structure and Motion from Line Segements in Multiple Images," PAMI 17:11 1021–1032, 1995. Additionally, in "A unified factorization algorithm for points, line segments and planes with uncertainty models" K. Morris and I. Kanade, ICCV 696–702, 1998, describes work on lines in an affine framework. A projective method for lines and points is described in "Factorization methods for projective structure and motion", B. Triggs, CVPR 845–851, 1996, which involves computing the projective depths from a small number of frames. "In Defense of the Eight-Point Algorithm: PAMI 19, 580–593, 1995, Hartley presented a full perspective approach that reconstructs from points and lines tracked over three images.

The approach described in M. Irani, "Multi-Frame Optical Flow Estimation using Subspace Constraints," ICCV 626–633, 1999 reconstructs directly from the image intensities. The essential step of Irani for recovering correspondence is a multi-frame generalization of the optical-flow approach described in B. Lucas and T. Kanade, "An Iterative Image Registration Technique with an Application to Stereo Vision", IJCAI 674–679, 1981, which relies on a smoothness constraint and not on the rigidity constraint. Irani uses the factorization of D simply to fill out the entries of D that could not be computed initially.

Irani writes the brightness constancy equation (7) in matrix form as $\Delta = -DI$, where D tabulates the shifts $d^i$ and I contains the intensity gradients $\nabla I(p_n)$. Irani notes that D has rank 6 (for a camera with known calibration), which implies that $\Delta$ must have rank 6. To reduce the effects of noise, Irani projects the observed $\Delta$ onto one of rank 6. Irani then applies a multi-image form of the Lucas-Kanade approach to recovering optical flow which yields a matrix equation $DI_2 = -\Delta_2$, where the entries of $I_2$ are squared intensity gradients $I_a I_b$ summed over the "smoothing" windows, and the entries of $\Delta_2$ have the form $I_a \Delta I$. Due to the added Lucas-Kanade smoothing constraint, the shifts D or $d_n^i$ can be computed as $D = -\Delta_2 [I_2]^+$ denotes the pseudo-inverse, except in smoothing windows where the image intensity is constant in at least one direction. Using the rank constraint on D, Irani determines additional entries of D for the windows where the intensity is constant in one direction.

SUMMARY OF THE INVENTION

The present invention is directed to a method for recovering 3D scene structure and camera motion from image data obtained from a multi-image sequence, wherein a reference image of the sequence is taken by a camera at a reference perspective and one or more successive images of the sequence are taken at one or more successive different perspectives by translating and/or rotating the camera. The method comprising the steps of:

(a) determining image data shifts for each successive image with respect to the reference image; the shifts being derived from the camera translation and/or rotation from the reference perspective to the successive different perspectives;

(b) constructing a shift data matrix that incorporates the image data shifts for each image;

(c) calculating two rank-3 factor matrices from the shift data matrix using SVD, one rank-3 factor matrix corresponding the 3D structure and the other rank-3 factor matrix corresponding the camera motion;

(d) recovering the 3D structure from the 3D structure matrix using SVD by solving a linear equation; and (e) recovering the camera motion from the camera motion matrix using the recovered 3D structure.

The method of the invention is a general motion algorithm wherein the camera positions for each successive perspective do not lie on a single plane. The method can reconstruct the image from points, lines or intensities.

The present invention is an essentially linear algorithm that combines feature-based reconstruction and direct methods. It can use feature correspondences, if these are available, and/or the image intensities directly. Unlike optical-flow approaches such as that described in "Determining Optical Flow", B. K. P Horn and B. G. Schunck, AI 17, 185–203, 1981, the algorithm exploits the rigidity constraint and needs no smoothing constraint in principle assuming the motion is small and the brightness constancy equation is valid. However, in practice, it is sometimes necessary to impose smoothness in the algorithm.

The method of the present invention can reconstruct from both point and line features. This is an important aspect of the present invention, since straight lines are abundant, especially in human-made environments, and it is often possible to track both feature types. Lines can be localized very accurately due to the possibility of finding many sample points on a single line, and they do not suffer from some of the problems of point tracking such as spurious T-junctions and the aperture effect. The method described here is the first that can reconstruct from all three types of input data in any combination or separately over a sequence of arbitrarily many images under full perspective.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

Definitions

Figure 1:
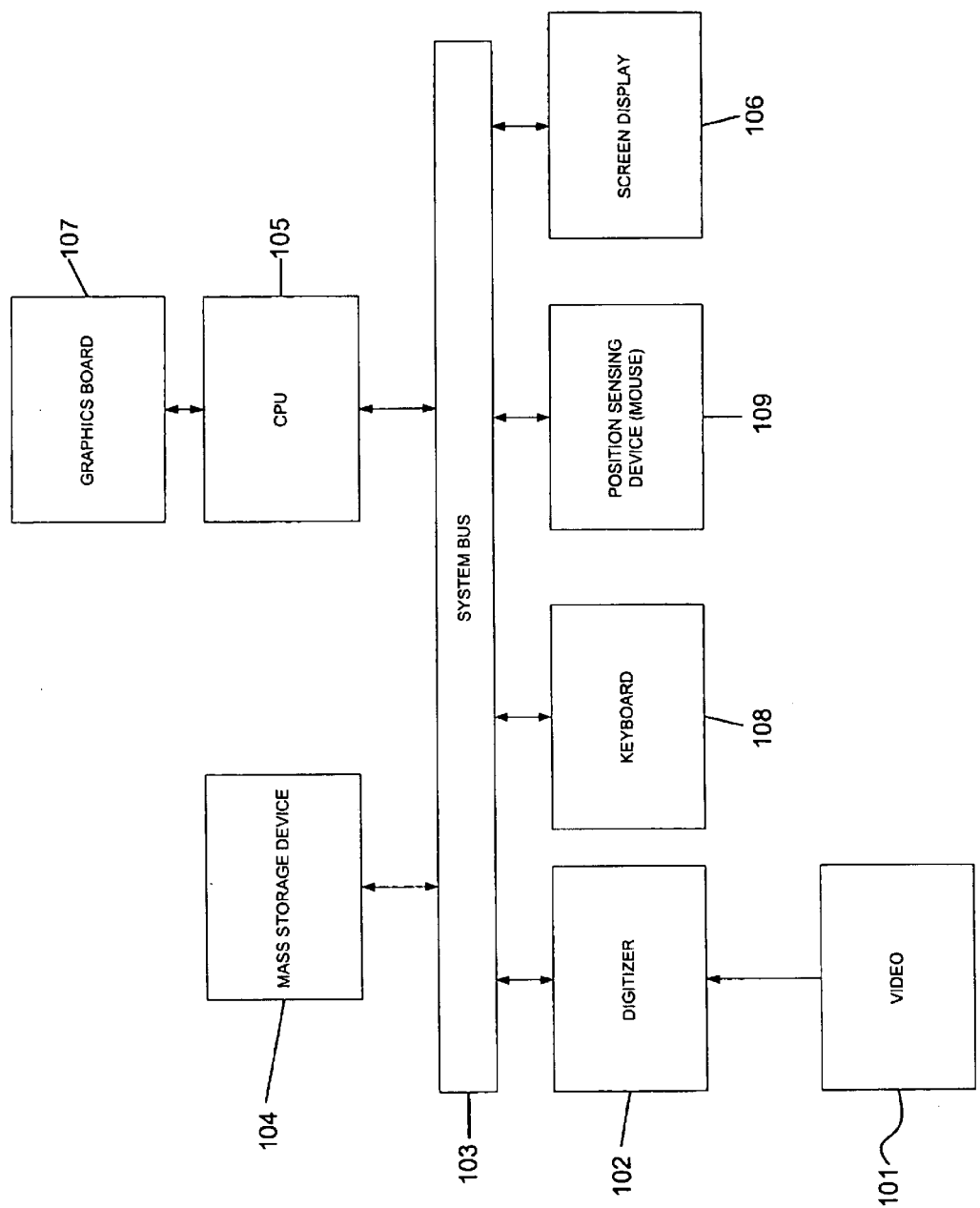
FIG. 1 schematically illustrates a hardware implementation of the present invention.

For purposes of this disclosure, the invention will be described in accordance with the following terms defined herein. The method of the present invention assumes that the calibration is known and takes the focal length to be 1 (wlog). Modifications to the method for uncalibrated sequences will be discussed later.

Assuming a sequence of $N_i$ images. Choose the zeroth image as the reference image. Let $R^i$, $T^i$ denote the rotation and translation between this image and image i. Parameterize small rotations by the rotational velocity $\omega \equiv (\omega_x^i, \omega_y^i, \omega_z^i)^T$. Let $[T^i]_2 \equiv (T_x^i, T_y^i)^T$.

Let a 3D point P transform as $P' = R(P-T)$. Assume $N_p$ points and $N_L$ lines tracked over the sequence. For clarity, we use a different notation for the tracked points than for the pixel positions in the intensity images. Let $q_m^i \equiv (q_x, q_y)_m^i$ denote the m-th tracked point and $A_l^i \equiv (\alpha, \beta, \gamma)_l^{T_i}$ denote the i-th line in the i-th image. Let $\bar{q} = (q;1)^T$. Let $R*q$ denote the image point obtained from q after a rotation: $R*q \equiv [(R\bar{q})_x, (R\bar{q})_y]^T/(R\bar{q})_z$. Define the three point rotational flows $r^{(1)}(x,y)$, $r^{(2)}(x,y)$, $r^{(3)}(x,y)$, by $$[r^{(1)}, r^{(1)}, r^{(1)}] \equiv \left[\begin{pmatrix} -xy \\ -(1+y^2) \end{pmatrix}, \begin{pmatrix} 1+x^2 \\ xy \end{pmatrix}, \begin{pmatrix} -y \\ x \end{pmatrix}\right].$$

$\hat{q}_m^i$ denotes the 3D unit vector $\bar{q}/|\bar{q}| = (q;1)^T/|(q;1)|$. Similarly, $\hat{A} = A/|A|$. Let $s_m^i \equiv q_m^i - q_m^0$ denote the image displacement for the m-th tracked point and $Q_m = (Q_x, Q_y, Q_z)_m^T$ denote the 3D scene point corresponding to the tracked point $q_m$. Then parameterize a 3D line L by two places that it lies in. The first plane, described by A, passes through the center of the projection and the imaged line in the reference image. The normal to the second plane, B, is defined by requiring $B \cdot A = 0$ and $B \cdot Q = -1$ for any point Q on L.

Let $p_n \equiv (x_n, y_n)^T$ be the image coordinates of the n-the pixel position. Order the pixels from 1 to $N_x$, the total number of pixels. Let $I^i$ denote the i-the intensity image and let $I_n^i = I^i(p_n)$ denote the image intensity at the n-the pixel position in $I^i$. Let $P_n$ denote the 3D point imaged at $p_n$ in the reference image, with $P_n \equiv (X_n, X_n, Xn)^T$ in the coordinate system of $I^0$. Let $d_n^i$ denote the shift in image position from $I^o$ to $I^i$ of the 3D point $P_n$.

Suppose $V^\alpha$ is a set of quantities indexed by the integer $\alpha$. We use the notation $\{V\}$ to denote the vector with elements given by the $V^\alpha$.

Algorithm Description-Preliminary Processing

The method of the present invention requires that the translational motion not be to large, (e.g., with $|T/Z_{min}| \leq 1/3$ and that the camera positions do not lie in a plane.

Given tracked points and lines, we approximately recover the rotations between the reference image and each following image by minimizing:

$$\sum_m (\hat{q}_n^i - R^i q_m^o)^2 + \mu \sum_l (\hat{A}_l^i - R^i \hat{A}_l)^2 \qquad (1)$$

with respect to the rotations $R^i$, where one should adjust the constant according to the relative accuracy of the point and line measurements. Minimizing equation (1) gives accurate rotation as long as the translations are not too large. After recovering the rotations, compensation is made for them and henceforth they can be treated as small.

Points

Point displacements are calculated in accordance with J. Oliensis, "A Multi-Frame Structure from Motion Algorithm under Perspective Projection", IJCV 34:2/3 163–192, 1999, incorporated herein by reference, the point displacements are $$s_m^i = \frac{Q_{z,m}^{-1}(q_m T_z^i - [T^i]_2)}{1 - Q_{z,m}^{-1} T_z^i} + f(R^i, q_m^i)$$

where the rotational flow $f(R^i, q_m^i) \equiv q_m^i - (R^i)^{-1} * q_m^i$. Under the assumptions, we can approximate $s_m^i \approx Q_{z,m}^{-1}(q_m T_z^i - [T^i]_2) + \omega_x^i r^{(1)}(q_m) + \omega_{yx}^i r^{(2)}(q_m) + \omega_z^i r^{(3)}(q_m)$ where the last three terms give the first-order rotational flow. Correspondingly, define the three length-$2N_p$ translational flow vectors $$\Phi_x \equiv -\begin{bmatrix} (Q_z^{-1}) \\ \{0\} \end{bmatrix} \quad \Phi_y \equiv -\begin{bmatrix} \{0\} \\ \{Q_z^{-1}\} \end{bmatrix} \quad \Phi_z \equiv -\begin{bmatrix} \{q_x Q_z^{-1}\} \\ \{q_y Q_z^{-1}\} \end{bmatrix}$$

and the length $-2N_p$ rotational flows $$\Psi_x \equiv \begin{bmatrix} \{r_x^{(1)}(q)\} \\ \{r_y^{(1)}(q)\} \end{bmatrix} \quad \Psi_y \equiv \begin{bmatrix} \{r_x^{(2)}(q)\} \\ \{r_y^{(2)}(q)\} \end{bmatrix} \quad \Psi_z \equiv \begin{bmatrix} \{r_x^{(3)}(q)\} \\ \{r_y^{(3)}(q)\} \end{bmatrix}$$

Then collect the shifts, $s_m^i s_m^i$ into a $N_i \times 2N_p$ matrix S, where each row corresponds to a different image i and equals $[\{s_x^i\}^T \{s_y^i\}^T]$. Then $$S \approx \{T_x\}\Phi_x^T + \{T_x\}\Phi_x^T + \{T_x\}\Phi_x^T + \{\omega_x\}\Psi_x^T + \{\omega_y\}\Psi_y^T + \{\omega_z\}\Psi_z^T. \quad (2)$$

Lines

The line measurement model is described as follows. One can reasonably assume that the noise of a measured line is proportional to the integrated image distance between the measured and true positions of the line. Let $\Theta_{FOV}$ denote the field of view (FOV) in radians. Typically, $\Theta_{FOV} < 1$. If the measured line differs from the true one by a z-rotation, this gives a noise of $O((\Theta_{FOV}/2)^2)$. A rotation around an axis in the x-y plane gives a noise of $O(\Theta_{FOV})$, which is typically larger. (These estimates reflect the fact that the displacement region bounded by the true and measured lines look like two triangles in the first case and a quadrilateral in the second. For the representation described herein, this implies that line measurements determine $A_z$ more accurately than $A_x$, $A_y$ by a factor roughly of $1/\Theta_{FOV}$.

The Image flow for lines can be described as follows. Let $A \equiv (A;0)$ and $B \equiv (B;-1)$ be the homogeneous length-4 vectors corresponding to the plane normals A and B for the line L. Let $Q \equiv (Q;1)$ be the homogeneous vector corresponding to a point on L. Then $A \cdot B = A \cdot Q = B \cdot Q = 0$. After rotation R and translation T, we determine the transformed A'B' from the requirement that $A' \cdot Q' = B' \cdot Q' = 0$. We can satisfy this requirement using $$A^* = \begin{bmatrix} RA \\ T \cdot A \end{bmatrix}, B^* = \begin{bmatrix} RB \\ T \cdot B + B_4 \end{bmatrix}.$$

But A* doesn't necessarily have $A_4' = 0$, as the A' for the new image of the line must. So we set $A' \equiv A^* - A_4^* B^*/B_4^*$, which implies that the new image line is given by $$A' \equiv R\left(A - B\frac{T \cdot A}{T \cdot B + B_4}\right). \quad (3)$$

Now consider the line flow $\delta A_l^i = A_l^i - A_l^0$. Define $\delta A_R = A' - R^{-1}A^i$ and $$\delta A_T \equiv R^{-1}A^i - A = \frac{(T \cdot A)}{1 - T \cdot B}B \text{ so } \delta A = \delta A_T + \delta A_R.$$

For small rotations and translations, with $|T \cdot B| << 1$, $$\delta A^i \approx (T \cdot A)B + \omega \Delta A. \quad (4)$$

$B \cdot A = 0$ implies that $\delta A \cdot A \approx 0$. To eliminate the scale ambiguity in defining each A, we take $|A_1^0| = 1$ in the reference image and require that the line flow satisfies $0 = \delta A_l^i \cdot A_l^0 \equiv (A_l^i - A_l^0) \cdot A_l^0$ exactly. We normalize all $A^0$ to the same magnitude in the reference image to reflect the fact that the measurement errors should be similar for all lines. The requirement that $0 = \delta A_l^i \cdot A_l^0$ "fixes the gauge" in a way that is consistent with our line representation and small-motion assumption.

After "gauge fixing" each $\delta A_l^i$ incorporates just two degrees of freedom. We represent $\delta A_l^i$ by its projection along two directions, $A_l \times (\hat{z} \times A_l)$ and $\hat{z} \times A_l$, which we refer to respectively as the upper and lower directions. Let the unit 3-vector $P_U^l$ and $P_L^l$ project onto these two directions. For typical $\Theta_{FOV} < 1, |A_l \cdot \hat{z}| << 1$ and the upper component of $A_l$ roughly equals $A_{l,z}$. Thus, image measurements determine the upper component more accurately than the lower, by roughly $1/\Theta_{FOV}$. In analogy to the point definitions, define the line translation flows $$\Phi_{Lx} \equiv \begin{bmatrix} \{A_x B_U\} \\ \{A_x B_L\} \end{bmatrix} \quad \Phi_{Ly} \equiv \begin{bmatrix} \{A_y B_U\} \\ \{A_y B_L\} \end{bmatrix} \quad \Phi_z \equiv \begin{bmatrix} \{A_z B_U\} \\ \{A_z B_L\} \end{bmatrix}$$

where these are length-$2N_L$ vectors. $B_U \equiv B \cdot P_U$ and $B_L \equiv B \cdot P_L$ are the upper and lower components of B. Similarly, define the rotational flows $$\Psi_{Lx} \equiv \begin{bmatrix} \{P_U \cdot (x \times A)\} \\ \{P_L \cdot (x \times A)\} \end{bmatrix} \quad \Psi_{Ly} \equiv \begin{bmatrix} \{P_U \cdot (y \times A)\} \\ \{P_L \cdot (y \times A)\} \end{bmatrix} \quad \Psi_z \equiv \begin{bmatrix} \{P_U \cdot (z \times A)\} \\ \{P_L \cdot (z \times A)\} \end{bmatrix} \quad (5)$$

Let $\Lambda$ be the $N_1 \times 2N_L$ matrix where each row corresponds to a different image i and equals $[\{P_U \cdot \delta A^i\}^T \{P_U \cdot \delta A^i\}^T]$. Then $$\Lambda \approx \{T_x\}\Phi_{Lx}^T + \{T_y\}\Phi_{Ly}^T + \{T_z\}\Phi_{Lz}^T + \{\omega_{yz}\}\Psi_{Lx}^T + \{\omega_{yz}^T\}\Psi_{Ly}^T + \{\omega_{zz}\}\Psi_{Lz}^T \quad (6)$$

Intensities

One can apply the same arguments to the $d_n^i$, the image shifts corresponding to the 3D point imaged at the pixel position $p_n$, as to the $s_m^i$ for the tracked feature points. Thus $d_n^i \approx Z_n^{-1}(p_n T_z^i - [T^i]_z) + \omega_x^i r^{(1)}(p_n) + \omega_x^i r^{(2)}(p_n) + \omega_x^i r^{(3)}(p_n)$. Let $\nabla I_n \equiv \nabla I(p_n) \equiv (I_x, I_y)_n^T$ represent the gradient of the image intensity for $I^0$, with some appropriate definition for a discrete grid of pixels. Let $\Delta I_n^i$ define the change in intensity with respect to the reference image. Its simplest definition is $\Delta I_n^i = I_n^i - I_n^0$. The brightness constancy equation is $$\Delta I_n^i + \nabla I_n \cdot d_n^i = 0. \quad (7)$$

This and the previous equation imply that $-\Delta I_n^i = \nabla I_n \cdot d_n^i \approx Z_n^{-1}(\nabla I_n \cdot p_n T_z^i - \nabla I_n \cdot [T^i]_z) + \nabla I_n \cdot (\omega_x^i r_n^{(1)} + \omega_y^i r_n^{(2)} + \omega_y^i r_n^{(3)})$. Define the three length $-N_x$ translational flow vectors $\Phi_{Ix} \equiv -\{Z^{-1}I_x\}$, $\Phi_{Iy} \equiv -\{Z^{-1}I_y\}$, $\Phi_{Iz} \equiv \{Z^{-1}(\nabla I \cdot p)\}$, and the length $-N_x$ rotational flows, $\omega_{Ix} \equiv -\{\nabla I \cdot r^{(1)}(p)\}$, $\omega_{Iy} \equiv -\{\nabla I \cdot r^{(2)}(p)\}$, $\omega_{Iz} \equiv -\{\nabla I \cdot r^{(3)}(p)\}$. Let $\Delta$ be a $N_1 \times N_x$ matrix, where each row corresponds to an image i and equals $\{\Delta I^i\}^T$. Then $$\Delta \approx \{T_x\}\Phi_{Ix}^T + \{T_y\}\Phi_{Iy}^T + \{T_z\}\Phi_{Iz}^T + \{\omega_z\}\Psi_{Ix}^T + \{\omega_y\}\Psi_{Iy}^T + \{\Psi_z\}\Psi_{Iz}^T. (8)$$

Reconstruction

The reconstruction of the 3D scene is described as follows. Define the total rotational flow vectors for points, lines and image intensities by $\overline{\Psi}_x^T = [\Psi_x^T \omega_L \Psi_{Lx}^T \omega_1 \Psi_{Ix}^T]$, and similarly for the y and z components. Here $\omega_L$ and $\omega_1$ are constant weights that the user should set according to the relative noisiness of the point, line, and intensity data. The $\overline{\Psi}_\alpha$ have length $2N_p + 2N_L + N_x \equiv N_{tot}$. One can verify from the definitions that the $\overline{\omega}$ are computable from measured quantities and can be taken as known. Using Householder matrices, one can compute a $(N_{tot} - 3) \times N_{tot}$ matrix H annihilating the three $\overline{\omega}_{x,y,z}$. Computing and multiplying by H cost $O(N_{tot})$ computation. Define the $N_1 \times N_{tot}$ matrix $\overline{D} \equiv [S \ \omega_L \Lambda \ \omega_L \Delta]$. Let C be a constant $(N_1 - 1) \times (N_1 - 1)$ matrix with $C_{ii'} \equiv \delta_{ii'} + 1$, we include C to counter the bias due to singling out the reference image for special treatment. Define $$\overline{D} \equiv C^{-\frac{1}{2}} \overline{D} H^T.$$

Define the total translational flow vectors by $$\Phi_x \equiv \begin{bmatrix} \Phi_x \\ \omega_L \Phi_{Lx} \\ \omega_1 \Phi_{1x} \end{bmatrix},$$

and similarly for y and z. From above, equations (2), (6) and (8) imply that $$\overline{D}_{CH} \approx C^{-\frac{1}{2}} \{T_x\} \overline{\Phi}^T H^T + C^{-\frac{1}{2}} \{T_y\} \overline{\Phi}_y^T H^T + C^{-\frac{1}{2}} \{T_z\} \overline{\Phi}_z^T H^T. \quad (9)$$

$\overline{D}_{CH}$ is approximately rank 3.

Our basic algorithm of the method of the present invention is,

1) Define H and compute $\overline{D}_{CH}$. Using the singular value decomposition (SVD), compute the best rank-3 factorization of $\overline{D}_{CH} \approx M^{(3)} S^{(3)T}$ where $M^{(3)}$, $S^{(3)}$ are rank 3 matrices corresponding respectively to the motion and structure.

2) $S^{(3)}$ satisfies, $$[\overline{\Phi}_x \, \overline{\Phi}_y \, \overline{\Phi}_z] = H^T S^{(3)} U + [\overline{\Psi}_x \, \overline{\Psi}_y \, \overline{\Psi}_z] \Omega \quad (10)$$

where U and $\Omega$ are unknown 3×3 matrices. We eliminate the unknowns $Q_z$, $B_z$ and $Z^{-1}$ from the $\overline{\Phi}_\alpha$ in this system of equations to get $3N_{tot}$ linear constraints on the 18 unknowns in U and $\Omega$. We solve these constraints with $O(N_{tot})$ computations using the SVD.

3) Given U and $\Omega$, we recover the structure unknowns $Q_z$, $B_z$ and $Z^{-1}$ from $[\overline{\Phi}_x \, \overline{\Phi}_x \, \overline{\Psi}_x] = H^T S^{(3)} U + [\overline{\Psi}_x \, \overline{\Psi}_y \, \overline{\Psi}_z] \Omega$ where Q is the 3d coordinate for an image pixel in the reference image, B is the shortest vector from the camera center to a 3D line and Z is the depth from the camera to a 3D scene alone the cameras optical axis.

4) Given U, we use $S^{(3)} U \approx [\overline{\Phi}_x \, \overline{\Phi}_y \, \overline{\Phi}_z]$ and $$\overline{D}_{CH} \approx C^{-\frac{1}{2}} \{T_x\} \overline{\Phi}^T H^T + C^{-\frac{1}{2}} \{T_y\} \overline{\Phi}_y^T H^T + C^{-\frac{1}{2}} \{T_z\} \overline{\Phi}_z^T H^T$$

to recover the translations.

5) We recover the rotations $\omega_x^i$, $\omega_y^i$, $\omega_z^i$ from $$\omega_x^i \Psi_{xn} + \omega_{yx}^i \Psi_{yn} + \omega_{zx}^i \Psi_{zn} = C^{-\frac{1}{2}} \overline{D}_n^i - \left( C^{-\frac{1}{2}} \left( \{T_x\} \Phi^T + \{T_y\} \Phi_y^T + \{T_z\} \Phi_z^T \right) \right)_n^i$$

The description above omits some steps, which are important for bias correction. 1) The upper line components in $\overline{D}$ are weighted by a factor proportional to $1/\Theta_{FOV}$, to account for the greater accuracy in the measurement of these components. 2) To correct for bias due to the fact that the FOV is typically small, in Steps 2–4 we weight $T_z^i$ by a factor proportional to the FOV and weight $\overline{\Phi}_z$ by the inverse of this, while leaving the x and y Components untouched. 3) The steps of the algorithm can be iterated to give better results and correct for the small motion assumptions. This involves multiplying the original feature point shifts by $1-Z^{-1}T_z$ and the line shifts by $1-B\cdot T$. The algorithm is guaranteed to converge to the correct reconstruction if the motion and noise are small and the camera positions do not lie on a plane.

Of course, the results for the intensity-based part of our algorithm depend crucially on the technique used for computing derivatives. To make this more robust, one should iteratively reduce the size of the displacements $d_n^i$ by warping and recomputing the reconstruction in a coarse-to-fine mode. One implementation simply computes the image derivatives at a single scale, using consistency between the spatial derivatives computed for different images to determine whether the assumption of small image motion holds for this current scale. Only those pixel sites where the assumption does hold are used for the motion computation.

We have sometimes found it useful to preprocess the image intensities prior to running the algorithm. We first compute a Laplacian image and then transform the intensities by a stigma function to enhance edgy regions and suppress textureless ones. This gives the intensity image a form that is intermediate between the unprocessed images and a selected set of tracked features.

Bas-Relief for Lines

Due to the bas-relief ambiguity, it is difficult to recover the constant component of the vector $\{Z^{-1}\}$ for point features, though typically one can recover all other components accurately. A similar result can be derived for lines. The rotational flow for a line is $\omega \times A$. For typical $\Theta_{FOV} << 1$, $|A_z| << |A_{x,y}|$. Thus $\hat{x}$ and $\hat{y}$ rotations give flows roughly proportional to $\hat{y} \times A \sim -A_x \hat{z}$ and $(\hat{x} \times A) \sim -A_y \hat{z}$. From equation (4) above, the effects of a z-translation $T_z$ are suppressed by $|A_z|$, and the translational flows due to the constant component of $\{B_z\}$ constant component from rotational effects, which makes this component difficult to recover accurately.

One can get a more quantitative analysis of this effect as follows. Assuming that the input data consists of lines only, $[\overline{\Phi}_x \, \overline{\Phi}_x \, \overline{\Phi}_x] = H^T S^{(3)} U + [\overline{\Psi}_x \, \overline{\Psi}_y \, \overline{\Psi}_z] \Omega$ implies that $\overline{P}_s H[\overline{\Phi}_{Lx}, \overline{\Phi}_{Ly}, \overline{\Phi}_{Lz}] = 0$ where $\overline{P}_s$ is a projection matrix that annihilates $S^{(3)}$. Those $\{B\}$ components that produce small overlaps $$\sum_a \Phi_{La}^T H^T P_s H \Phi_{La},$$

will also produce small overlaps $$\sum_a \Phi_{La}^T H^T P_s H \Phi_{La}.$$

It follows from standard perturbation theory that noise will mix these components into the true solution for the B, where the amount of contamination is inversely proportional to the size of the eigenvalue. Define $B \equiv [\{B_x\}; \{B_y\}; \{B_z\}]$. We computed for several sequences the eigenvalues of $H_B$, defined such that $$B^T H_B B = \sum_a \Phi_{La}^T H^T H \Phi_{La},$$

and found that, as expected, there was one small eigenvalue, whose eigenvector approximately equaled the constant component of $\{B_z\}$. Thus one can use the input data to estimate the inaccuracy in recovering this component.

General-Motion Algorithm for Intensities

The General Motion Algorithm for just Intensities is as follows.

0. First, assuming that the translations are zero, we recover the rotations and warp all images $I^1 \ldots I^{N-1}$ toward the reference image $I^0$. In this case we then let the image displacements $d_n^i$ refer to the unrotated images.

1. We then compute H and $$\Delta_{CH} \equiv C^{-\frac{1}{2}} \Delta H^T,$$

and using the singular value decomposition (SVD), compute the best rank-3 factorization of $-\Delta_{CH}\overline{D}_{CH} \approx M^{(3)}S^{(3)T}$, where $M^{(3)}$ and $S^{(3)}$ are rank 3 and correspond respectively to the motion and structure.

2a. Further $S^{(3)}$ satisfies, $\Phi = H^T S^{(3)} U + \Psi \Omega$
where U and $\Omega$ are unknown 3×3 matrices. We eliminate the unknowns $Z^{-1}$ from the $\overline{\Phi}_\alpha$ in this system of equations to get $3N_p$ linear constraints on the 18 unknowns in U and $\Omega$. We solve these constraints with $O(N_p)$ computations using the SVD. Then given U and $\Omega$, we recover the structure unknowns $Z^{-1}$ from (5).

2b. Then given U, we use $S^{(3)} U \approx \Phi$ and equation (4) to recover the translations.

3. The rotations W can then be recovered from $$-C^{-\frac{1}{2}} W \Psi^T = -C^{-\frac{1}{2}} (\overline{T}\Phi^T + \Delta).$$

Algorithm Analysis

Step 0.

Our neglect of the translations in the basic general-motion algorithm above produces small errors in recovering the rotations when the translations are moderate, with $|T_{true}^i|/Z_{min} \leq 1/4$ as described in "Rigorous Bounds for Two-Frame Structure from Motion," J. Oliensis IUW, 1225–1231, 1994. We describe two multi-frame techniques for recovering the rotations. Neglecting the translations in (4) gives $$-C^{-\frac{1}{2}} \Delta \approx -C^{-\frac{1}{2}} W \Psi^T,$$

which can be solved for W. This technique resembles the projective algorithm of L. Zelnik-Manor and M. Irani, described in "Multi-Frame Alignment of Planes", CVPR I:151–156, 1999 for reconstructing planar scenes, except that our use of $$-C^{-\frac{1}{2}}$$

reduces the bias due to overemphasizing the noise in the reference image. As usual, one can extend the technique to larger rotations by iteratively warping and re-solving for W.

The technique just described is best for small rotations, since it uses the first-order rotational displacements. Another approach begins with the extension to planar scenes as described in "Structure from Motion from Points, Lines and Intensities, J. Oliensis and M. Werman CVPR 2000 of the multi-frame Sturm-Triggs technique set forth in "A factorization based algorithm for multi-image projective structure and motion", P. Sturm and B. Triggs, ECCV 709–720, 1996. This multi-frame approach recovers homographies of arbitrary size between the reference image and the subsequent images. One can recover the rotations by choosing the orthogonal, positive-determinant matrices closest to the recovered homographies.

Step 2a.

From (4), the columns of $S^{(3)}$ generate approximately the same subspace as that generated by the $\Phi_x$, $\Phi_y$, $\Phi_z$;

$$S^{(3)} U \approx H \Phi$$

where U is a 3×3 matrix. (7) Above gives an overconstrained system of linear equations that one can solve directly for U and $Z_n^{-1}$. However this is an $O(N_p^3)$ computation. For large images, we use instead the following $O(N_p)$ technique.

First we define $\overline{P} \equiv H^T H$, a projection matrix. Multiplying (7) by $H^T$ gives $H^T S^{(3)} U \approx \overline{P} \Phi$, which implies $$\Phi \approx H^T S^{(3)} + \Psi \Omega$$

We eliminate the $Z_n^{-1}$ from (8) above and solve directly for U and $\Omega$. Denote the columns of U by $U \equiv [U_1\ U_2\ U_3]$, and similarly for $\Omega$. Let $U_3' \equiv s^{-1} U_3$ and $\Omega_3' \equiv s^{-1} \Omega_3$, where the scale s equals the average distance of the image points from the image center. We include s to reduce the bias of the algorithm. From the definitions of $\Phi_x$, $\Phi_y$, $\Phi_z$, (8) above implies $I_{yn}[H^T S^{(3)} U_1 + \Psi \Omega_1]_n \approx I_{xn}[H^T S^{(3)} U_2 + \Psi \Omega_2]_n$, $\approx I_{yn}[H^T S^{(3)} U_3' + \Psi \Omega_3']_n - s^{-1}(\nabla I_n \cdot p_n)[H^T S^{(3)} U_2 + \Psi \Omega_2]_n \geq I_{yn}[H^T S^{(3)} U_3' + \Psi \Omega_3']_n$ and a similar equation with (x↔y). Step 2A of our algorithm solves this system of linear equations for $\Omega$ and U in the least-squares sense and then recovers the $Z_n^{-1}$ from these solutions and (8) above. The computation is $O(N_p)$. Note also that step 2a bases its computations on $\nabla I$. If we use the value of $\nabla I$ computed from the measured reference image $I^0$, then the estimates of U, $\Omega$, $Z_n^{-1}$ multi-frame estimates. To get a better multi-frame estimate, one can first re-compute $I^0$ and $\nabla I$ based on all the image data and use the result to compute U, $\Omega$ via (9) as follows.

Let $\Delta_{CH}^{(3)}$ be the best rank 3 approximation to $$\Delta_{CH} \equiv C^{-\frac{1}{2}} \Delta H^T.$$

Up to unknown rotational flows, $\Delta_{CH}^{(3)} H$ gives the intensity shifts due to the translational displacements:

$$C^{-\frac{1}{2}} \Delta \approx \Delta_{CH}^{(3)} H + W \Psi^T$$

We then solve (10) in the least-squares sense for W, which gives improved estimates $\Delta_e$ for $\Delta$ and $I_e^0$ for $I^0$. These can then be used in (9). However, this computation of $I_e^0$ gives $O(N_I^{-1} \omega^2, N_I^{-2} \tau^2 Z^{-2})$ errors. If the original noise in $I^0$ is less than this, one should use $I^0$ directly in step 2a.

Step 2b.

We have $$C^{-\frac{1}{2}} \overline{T} \approx M^{(3)} U_T,$$

where $U_T$ is also a 3×3 matrix. The algorithm recovers $U_T$ and $\overline{T}$ by solving the linear system $-\Delta_{CH} \approx M^{(3)} U_T \Phi^T H^T$, for $U_T$, using the $\Phi$ computed previously, and then plugging in the result to recover $\overline{T}$.

General Notes

Experimentally, we find that the intensity pattern varies significantly from image to image in our sequences. We actually apply our approach to a modified version of the original sequence, obtained by:

1) Filtering the sequence with a laplacian of gaussian to emphasize edges;
2) Applying a nonlinear transformation (a sigma function) to further emphasize the high-frequency features. The new sequences give a continuous representation of the interest features, which can be used to compute derivatives. This procedure emphasizes the discrete, more easily trackable features, but does not eliminate the information from other image regions. One could extend this approach to deal with a variety of interest features, selecting among them to determine the derivatives that are likely to give the best flow. To ensure that the BCE is approximately valid, we also require that the spatial derivatives be consistent over the whole sequence, and that the image intensity be well approximated by a plane at the scale at which we are working. In our current implementation, we apply the algorithm at a single scale.

In another embodiment of the present invention, the algorithm described above can also handle: cameras with changing and unknown focal lengths, where the calibration is otherwise fixed and known and camera calibrations that change arbitrarily from image to image in an unknown fashion (this is know as the projective case).

For varying, unknown focal lengths, one can modify the algorithm along the line of the method described in "A Multi-frame Structure from Motion Algorithm under Perspective Projection" IJCV 34:2/3, 163–192, 199 and Workshop on Visual Scenes 77–84, 1999. The modification is described as follows, in Step 2a, we define H to annihilate $\Psi_F = \{p_n \cdot \nabla I(p_n)\}$ in addition to $\Psi_x$, $\Psi_y$, $\Psi_z$. In recovering the $Z_n^{-1}$ one must replace $\Psi$ in (8) by $[\Psi, \Psi_F]$, and $\Omega$ becomes a 4×3 matrix. The modified Step 2a can recover the $Z^{-1}$ except for the constant ($Z_n$=1) component, which is intrinsically difficult to recover accurately when the focal lengths are unknown and varying.

For the projective case, the algorithm can be modified along the lines of the method described in "Fast Algorithms for Projective Multi-Frame Structure from Motion", J. Oliensis and Y. Genc, ICCV 536–543, 1999. In this case, we define H to annihilate eight length-$N_p$ vectors, where the n-th entries of these vectors are given by the eight quantities $(\nabla I_n)_a$, $P_{nb}(\nabla I_n)_c$, $P_{nd}(\nabla I_n) \cdot p_n$, for a, b, c, d$\in\{x,y\}$. Step 2a must be modified by replacing $\Psi$ in (8) by a matrix consisting of these eight vectors.

Projective Algorithm

The algorithm described here for calibrated sequences generalizes in a straightforward way to deal with uncalibrated sequences. In this projective case, instead of a preliminary stage of rotation computation, one computes planar homographies between the reference image and each subsequent image. It is worth noting that one can easily and accurately compute these homographies by a multi-frame generalization of the projective-reconstruction method. We briefly describe how this works for the example of tracked points. Assume the scene is planar. Then $$\lambda_m^i q_m^{-i} = M^i S_m \quad (11)$$

where $M^i$ is a 3×3 matrix (a homography), $S_m$ is the structure 3-vector giving the position of the m-th point on the plane (in some arbitrary coordinate system), and $\lambda_m^i$ is the projective depth. The steps of the homography recovery are:

1) Take $\lambda_m^i=1$ initially.
2) For the current estimate of the $\lambda_m^i$, collect the $\lambda_m^i \overline{q}_m^i$ into a single $3N_1 \times N_p$ matrix $\Gamma$. Use the SVD to decompose this into the product of two rank 3 factors: $\Gamma \approx M^{(3)} S^{(3)}$.
3) For the current $M^{(3)}$, $S^{(3)}$, compute the $\lambda_m^i$ minimizing the $|\Gamma - M^{(3)} S^{(3)}|$. Return to Step 2.

After convergence, $M^{(3)}$ contains the $M^i$ estimates. Our estimate of the homography taking the reference image to image i is $M^0 \backslash M^i$. This procedure is guaranteed to converge to the local minimum of $$\frac{|\Gamma^{(4)}|^2}{|\Gamma|^2},$$

where $\Gamma^{(4)}$ is the difference between $\Gamma$ and its best rank-3 approximation. Also, it gives nearly the optimal estimates of the $M^i$ if the true motion is not too large and the scene is truly planar.

The uncalibrated version of the line-based algorithm is described as follows. Let $K^i$ be the standard 3×3 matrix, with zero lower-diagonal entries, giving the calibration parameters for the i-th image. For the uncalibrated case, equation (3) still holds if one replaces $R \to (K')^{-T} RK \equiv M_H$ and $T \to KT$, where K and K' are the calibration matrices for the first and second image. $M_H$ is a general homography and is the inverse transpose of the analogous homography for points. The first order approximation of the new version of $$A' = R\left(A - B\frac{T \cdot A}{T \cdot B + B_4}\right)$$

is $\delta A^i \approx (T \cdot A)B + \omega \times A$, but with $T \to KT$ and with $\omega \times A$ replaced by $\delta M_H A$, where $M_H \equiv 1 + \delta M_H$.

We define H to annihilate the first-order homography flow due to $\delta M_H$, instead of the rotational flows as for the calibrated case. Since the first-order approximation of $M_H^{-T}$ is $1 - \delta M_H^T$, one can easily define H to annihilate the first-order flows for both points and lines. Represent $$M_H \equiv \begin{bmatrix} F & G \\ J^T & 0 \end{bmatrix},$$

where F is 2×2 and G and J are 2×1. The first-order point and line displacements due to each of the 8 parameters in $\delta M_H$ are given in the following table:

|  | $F_{1,1}$ | $F_{1,2}$ | $F_{2,2}$ | $F_{2,2}$ | $G_1$ | $G_2$ | $J_1$ | $J_2$ |
|---|---|---|---|---|---|---|---|---|
| $A_x$: | $A_x$ | $A_y$ | 0 | 0 | $A_z$ | 0 | 0 | 0 |
| $A_y$: | 0 | 0 | $A_x$ | $A_y$ | 0 | $A_z$ | 0 | 0 |
| $A_z$: | 0 | 0 | 0 | 0 | 0 | 0 | $A_x$ | $A_y$ |
| $q_x$: | $-x$ | 0 | $-y$ | 0 | $-x^2$ | $-xy$ | $-1$ | 0 |
| $q_y$: | 0 | $-x$ | 0 | $-y$ | $-xy$ | $-y^2$ | 0 | $-1$ |

We define H to annihilate the 8 vectors associated with the columns of this table. After the indicated replacements, the uncalibrated algorithm is the same as the calibrated one. If one fixes the point coordinates in some reference image, the remaining freedom under a projective transform is $Z^{-1} \to ax + by + c + dZ^{-1}$ where x and y are the image coordinates. This corresponds to scaling and adding an arbitrary plane to the structure. One can derive a similar relation for B. Let P be a 3D point on the line determined by B. Then $B \cdot P = -1$ implies $B \cdot (x,y,1) = -Z^{-1}$. A projective transform must preserve $B' \cdot P' = -1$. From this, and the transform of $Z^{-1}$ given above, it follows that $B' - B = (a, b, c)$ up to a scaling, with the same constants a, b, c as for the point transform. This relation holds with the same constants for any line B.

The fact that B is recoverable only up to an overall shift is also clear from the uncalibrated version of the algorithm. When we use H to eliminate the first-order effects of small homographies, we also eliminate the translational image flows due to the three constant components of the B. Thus, these components cannot be recovered.

Implementation

It will be apparent to those skilled in the art that the methods of the present invention disclosed herein may be embodied and performed completely by software contained in an appropriate storage medium for controlling a computer.

Referring to FIG. 1, which illustrates in block-diagram form a computer hardware system incorporating the invention. As indicated therein, the system includes a video source 101, whose output is digitized into a pixel map by a digitizer 102. The digitized video frames are then sent in electronic form via a system bus 103 to a storage device 104 for access by the main system memory during usage. During usage the operation of the system is controlled by a central-processing unit, (CPU) 105 which controls the access to the digitized pixel map and the invention. The computer hardware system will include those standard components well-known to those skilled in the art for accessing and displaying data and graphics, such as a monitor, 106 and graphics board 107.

The user interacts with the system by way of a keyboard 108 and or a mouse 109 or other position-sensing device such as a track ball, which can be used to select items on the screen or direct functions of the system.

The execution of the key tasks associated with the present invention is directed by instructions stored in the main memory of the system, which is controlled by the CPU. The CPU can access the main memory and perform the steps necessary to carry out the method of the present invention in accordance with instructions stored that govern CPU operation. Specifically, the CPU, in accordance with the input of a user will access the stored digitized video and in accordance with the instructions embodied in the present invention will analyze the selected video images in order to extract the 3D structure and camera motion information from the associated digitized pixel maps.

Figure 2:
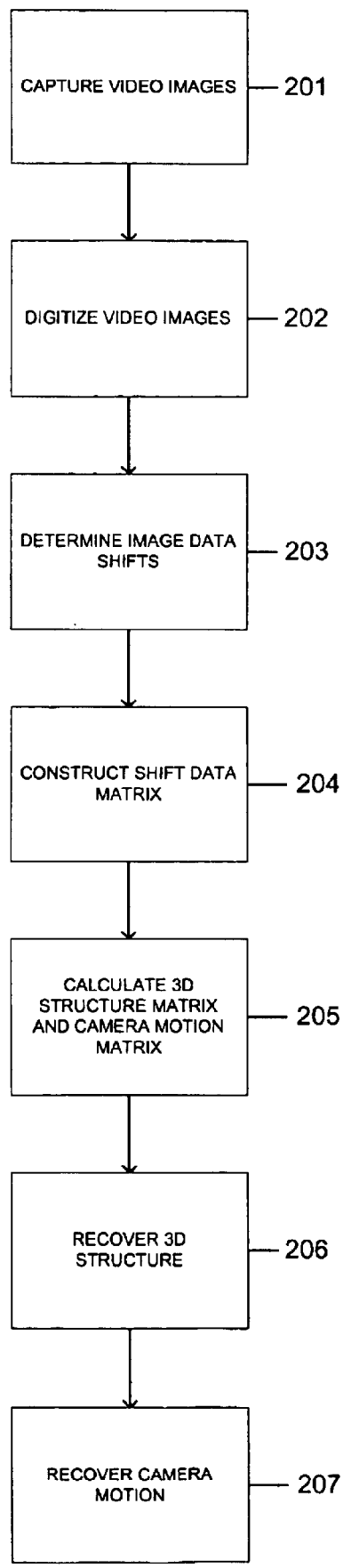
FIG. 2 is a block diagram that illustrates the method of the present invention.

Referring now to FIG. 2 the method of the present invention will be described in relation to the block diagram. A reference image of the sequence is taken by a camera at a reference perspective and one or more successive images of the sequence are taken at one or more successive different perspectives by translating and/or rotating the camera in step 201. Me images are then digitized 202 for analysis of the 3D image content, i.e. points, lines and image intensities. Then image data shifts for each successive image with respect to the reference image are determined 203; the shifts being derived from the camera translation and/or rotation from the reference perspective to the successive different perspectives. A shift data matrix that incorporates the image data shifts for each image is then constructed 204 and two rank-3 factor matrices from the shift data matrix using SVD, one rank-3 factor matrix corresponding the 3D structure and the other rank-3 factor matrix corresponding the camera motion are calculated 205. Recovering the 3D structure from the 3D structure matrix using SVD by solving a linear equation 206. The camera motion can then be recovered using the recovered 3D structure 207.

While there has been shown and described what is considered to be preferred embodiments of the invention, it will, of course, be understood that various modifications and changes in the form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An image processing method for recovery of a scene structure from successive image data, the method comprising the steps of:

(a) computing rotational motion in the successive image data using a combination of first rotational flow vectors derived from a set of tracked points collected from the successive image data second rotational flow vectors derived from a sat of tracked lines collected from the successive image data, where the first rotational flow vectors are represented by $$\Psi_x \equiv \begin{bmatrix} \{r_x^{(1)}(q)\} \\ \{r_y^{(1)}(q)\} \end{bmatrix}, \Psi_y \equiv \begin{bmatrix} \{r_x^{(2)}(q)\} \\ \{r_y^{(2)}(q)\} \end{bmatrix}, \Psi_z \equiv \begin{bmatrix} \{r_x^{(3)}(q)\} \\ \{r_y^{(3)}(q)\} \end{bmatrix}$$

where $r^{(1)}$, $r^{(2)}$, $r^{(3)}$ are three point rotational flows with respect to an image position q of one of the tracked points and where the second rotational flow vectors derived from the set of tracked lines are represented by projections in two directions that take into account differences in noise of a measured line in different directions and where the second rotational flow vectors are represented by $$\Psi_{Lx} \equiv \begin{bmatrix} \{P_U \cdot (\hat{x} \times A)\} \\ \{P_L \cdot (\hat{x} \times A)\} \end{bmatrix}, \Psi_{Ly} \equiv \begin{bmatrix} \{P_U \cdot (\hat{y} \times A)\} \\ \{P_L \cdot (\hat{y} \times A)\} \end{bmatrix}, \Psi_{Lz} \equiv \begin{bmatrix} \{P_U \cdot (\hat{z} \times A)\} \\ \{P_L \cdot (\hat{z} \times A)\} \end{bmatrix}$$

where A represents one of the tracked lines and $P_U$ and $P_L$ represent unit vectors projecting on the two directions;

(b) constructing a shift data matrix for the tracked lines and the tracked points that compensates for the rotational motion in the successive image data; and (c) decomposing the shi data matrix into a translational motion matrix and a structure matrix and recovering the scene structure by solving for the structure matrix.

2. The image processing method of claim 1 wherein ith rotational motion is compensated through linear elimination of rotational dependence in the shift data matrix.

3. The image processing method of claim 1 wherein the shift data matrix is decomposed using singular value docomposition.

4. The image processing method of claim 1 wherein components of the shift data matrix ae weighted to account for greater accuracy of measurement of the components.

5. The image processing method of claim 1 wherein the method is iterated until it converges to a reconstruction of the scene structure.

6. An image processing method for recovery of a scene structure from successive image data, the method comprising the steps of:

(a) parameterizing a set of tracked lines collected from the successive image data;

(b) computing rotational motion in the successive image data using rotational flow vectors derived from the tracked lines where the rotational flow vectors am represented by projections in two directions that take into account differences in noise of a measured line in different directions and where the rotational flow vectors are represented by $$\Psi_{Lx} \equiv \begin{bmatrix} \{P_U \cdot (\hat{x} \times A)\} \\ \{P_L \cdot (\hat{x} \times A)\} \end{bmatrix}, \Psi_{Ly} \equiv \begin{bmatrix} \{P_U \cdot (\hat{y} \times A)\} \\ \{P_L \cdot (\hat{y} \times A)\} \end{bmatrix}, \Psi_{Lz} \equiv \begin{bmatrix} \{P_U \cdot (\hat{z} \times A)\} \\ \{P_L \cdot (\hat{z} \times A)\} \end{bmatrix}$$

where A represents one of the tracked lines and $P_U$ and $P_L$ represent unit vectors projecting on the two directions;

(c) constructing a shift data matrix for the tracked lines that compensates for the rotational motion in the successive image data; and (d) decomposing the shift data matrix into a translational motion matrix and a structure matrix and recovering the scene structure by solving for the structure matrix.

7. The image processing method of claim 6 wherein the rotational motion is compensated through linear elimination of rotational dependence in the shift data matrix.

8. The image method of claim 6 wherein the shift data matrix is decomposed using singular value decomposition.

9. The image method of claim 6 wherein components of the shift data matrix are weighted to account for greater accuracy of measurement of the components.

10. The image processing method of claim 6 wherein the method is iterated until it converges to a reconstruction of the scene structure.

* * * * *